UNITED STATES PATENT OFFICE.

HANS BARDT, OF SANTIAGO, CHILE, ASSIGNOR TO SOCIEDAD HIDRO-METALURGICA, OF SANTIAGO, CHILE, A CORPORATION OF CHILE.

PROCESS FOR MANUFACTURING ELECTRODES.

1,423,071.   Specification of Letters Patent.   Patented July 18, 1922.

No Drawing.   Application filed September 17, 1921. Serial No. 501,420.

*To all whom it may concern:*

Be it known that I, HANS BARDT, citizen of Germany, residing at Santiago, Chile, have invented certain new and useful Improvements in Processes for Manufacturing Electrodes, of which the following is a specification.

The present invention relates to improvements in the manufacture of electrodes for electrolytic processes, in which peroxide of manganese or peroxide of lead has been used.

Up to the present, anodes of peroxide of manganese in a compact form have been made for electrolytic purposes by decomposing nitrate of manganese at a certain fixed temperature. Electrodes of this description, however, possess but a relatively small degree of conductivity, owing to the presence therein of considerable quantities of non-conducting manganese dioxide in an amorphous state, produced during the above procedure, and which is enveloped by the crystalline modification of manganese dioxide.

Another reason for the low conductivity of these electrodes is that during the process of decomposing nitrate of manganese, a great number of cavities form in the material, with the result that the electrodes are not produced in a completely compact state. Peroxide of lead anodes for electrolytic purposes were manufactured up to the present time, by electrolytically oxidizing, within a bath of sulphuric acid, lead oxide placed on grid plates in layers by means of a binding substance, thereby following the method generally employed in the manufacture of storage batteries. The life of this type of anode, when used for electrolytic purposes, is very short owing to the loose porous state of the layers of peroxide of lead.

Attempts were also made in the direction of electrodepositing peroxide of lead on to a suitable insoluble anode, using iron wire or a carbon-rod as anode material, a solution of nitrate of lead being the electrolyte.

With this procedure, however, metallic lead is deposited at the same time, at the cathode, forming oblong needles and leaves which must be continually removed as, otherwise, frequent short-circuits are caused thereby. Moreover, it is necessary to continually keep the acidity of the electrolyte as low as possible, maintaining its saturation by periodically adding lead oxide. A particularly troublesome feature of this procedure, however, is presented by the necessity of finally removing, by drilling or otherwise, the core (consisting, for instance, as in the above example, of iron wire or a carbon-rod), as otherwise the layer of peroxide of lead is thrown off. This is caused by nitrate being enclosed within the peroxide, the metal core or the carbon, respectively, forming a strong couple together with the peroxide layer, which latter is pushed from its supports. The removal, however, of the primary core by drilling or otherwise, leaves the peroxide layer in an extremely fragile condition and exposed to injurious influences. Due to all these circumstances, it has been found impossible up to the present time to manufacture peroxide of lead anodes in the form of plates.

It has also been proposed to impregnate the carbon rods with a suitable material before depositing the peroxide in order to fill up the pores and thereby to render possible the manufacture of faultless electrodes. This procedure, however, has not met with any success; furthermore, it only serves to complicate operations and to increase the production costs considerably.

Now, it has been proved by extensive experiments that it is possible to manufacture, by anodic deposition, electrodes of peroxide of manganese or of lead in a perfectly compact condition and with a high degree of conductivity, using ferro-silicon, magnetite, graphite, etc., or any other suitable substance as supporting material, provided that a solution of perchlorate of manganese, or of lead, or a mixture of both, is employed in the operation, containing a high percentage of free perchloric acid.

According to the invention thus defined, electrodes can be produced in any shape and form, for instance, as plates, grids, rods or tubes, without any necessity for removing the peroxide-holders after the peroxide has been deposited thereon, nor is the peroxide layer destroyed by any processes locally taking place within the electrode.

It has further been observed that peroxide electrodes having an extraordinarily large surface can be produced provided that, after a smooth and compact peroxide layer has been formed, the anode is charged with current of a density being a multiple of the density originally employed, and that the electrolyte contains a high percentage of free perchloric acid. Under these conditions, the electrode surface assumes a honey-combed appearance.

The following example may serve as an illustration:

In one litre of a 20 per cent perchloric acid solution, about 90 grammes of carbonate of manganese are dissolved, or an equivalent, such as lead oxide, in which case about 150 grammes of lead oxide are used. The solution thus obtained is electrolyzed at the temperature of the laboratory, using magnetic oxide of iron or ferro-silicon as anode material, and copper or lead-plate as cathodes. To commence with, a current density of 0.3 to 0.5 amperes per square decimetre of anode area is employed. As soon as a compact, uniform and thin peroxide film is deposited on the anode-surface, the current density of the anode is increased up to 2.5 to 3 amperes and then the electrolytic process is continued for a further period of time, according to the thickness of the peroxide layer which it is desired to produce.

In the same proportion as the electrolyte is impoverished during the operation in manganese or lead, respectively, fresh carbonate of manganese or lead oxide is continually introduced.

I claim:

1. Process for the manufacture of electrodes, which consists in electrolyzing a solution containing carbonate of manganese and an excess of perchloric acid, and employing anode material inert with respect to perchloric acid whereby a deposit of a peroxide film is formed upon the anode to serve as the desired electrode.

2. Process for the manufacture of electrodes, which consists in electrolyzing a solution containing carbonate of manganese and an excess of percholoric acid, and employing anode material inert with respect to perchloric acid, subjecting the mixture to a low current density, and after the formation of a thin peroxide film on the anode surface, increasing the current density over that first used whereby an increased thickness of the peroxide deposit is obtained and the completion of the electrode is effected.

3. Process for the manufacture of electrodes, which consists in electrolyzing a solution containing carbonate of manganese and an excess of perchloric acid, and employing anode material inert with respect to perchloric acid, subjecting the mixture to a current density of approximately 0.4 amperes per square decimeter of anode area, and after the formation of a thin peroxide film on the anode surface, increasing the current density to approximately 2.5 to 3 amperes thereby increasing the anode deposit and completing the desired electrode.

4. In a process for the manufacture of electrodes, the steps which consist in electrolyzing a solution containing carbonate of manganese and an excess of perchloric acid and employing anode material inert with respect to perchloric acid, subjecting the mixture to a current density of approximately 0.4 amperes per square decimeter of anode area; after the formation of a thin peroxide film on the anode surface, increasing the current density to approximately 2.5 to 3 amperes, and adding additional carbonate of manganese as electrolyzation takes place.

In testimony whereof I affix my signature.

HANS BARDT.

Witnesses:
WALTER J. TINGLE,
AL ARMEKER.